United States Patent
Hecht

(10) Patent No.: US 9,211,596 B2
(45) Date of Patent: Dec. 15, 2015

(54) DETACHABLE CUTTING TOOL SEGMENT WITH RESILIENT CLAMPING AND CUTTING TOOL THEREFOR

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 261 days.

(21) Appl. No.: 14/010,270

(22) Filed: Aug. 26, 2013

(65) Prior Publication Data

US 2015/0056026 A1    Feb. 26, 2015

(51) Int. Cl.
*B23B 27/04* (2006.01)
*B23C 5/22* (2006.01)
*B23C 5/08* (2006.01)

(52) U.S. Cl.
CPC ... *B23C 5/22* (2013.01); *B23C 5/08* (2013.01); *B23C 2210/161* (2013.01); *B23C 2210/168* (2013.01); *B23C 2260/52* (2013.01); *Y10T 407/1934* (2015.01); *Y10T 407/2282* (2015.01); *Y10T 407/2286* (2015.01); *Y10T 407/2288* (2015.01); *Y10T 407/25* (2015.01)

(58) Field of Classification Search
CPC .... B23B 27/04; B23B 27/16; B23B 27/1625; B23B 27/164; B23B 27/1666; B23B 29/043; B23B 29/06; B23B 29/14; B23B 2220/12; Y10T 407/193; Y10T 407/1932; Y10T 407/194
USPC ............. 407/72, 91, 102, 104, 107, 109, 110, 407/111, 113, 117; 81/177.85
See application file for complete search history.

(56) References Cited

U.S. PATENT DOCUMENTS

| | | | |
|---|---|---|---|
| 207,003 A | 8/1878 | Berry | |
| 341,187 A | 5/1886 | Timmons | |
| 1,434,629 A | 11/1922 | Petzold | |
| 2,860,863 A | 11/1958 | Bruestle et al. | |
| 3,887,975 A | 6/1975 | Sorice et al. | |
| 4,363,576 A * | 12/1982 | Zweekly | 407/50 |

(Continued)

FOREIGN PATENT DOCUMENTS

| | | |
|---|---|---|
| DE | 3119834 A1 * | 12/1982 |
| DE | 85 13 350.7 | 5/1985 |

(Continued)

OTHER PUBLICATIONS

International Search Report dated Oct. 28,2014 issued in PCT counterpart application (No. PCT/IL2014/050564).

*Primary Examiner* — Daniel Howell
*Assistant Examiner* — Nicole N Ramos
(74) *Attorney, Agent, or Firm* — Womble Carlyle Sandridge & Rice PLLC

(57) ABSTRACT

A cutting tool having at least one segment pocket formed at a peripheral surface thereof, and respectively, at least one cutting tool segment, detachably mounted in each segment pocket. Each cutting tool segment has a longitudinal segment axis extending in a rearward to forward direction, and upper and lower ends, located on opposite sides of the segment axis. The lower end has two spaced apart lower abutment surfaces. An insert retention portion is formed in the upper end, at a forward end of the cutting tool segment. A resilient retention arm is formed in the upper end, rearwardly spaced apart from the insert retention portion. The retention arm has an upper abutment surface. In a side view of the cutting tool segment, the upper and lower abutment surfaces are linear.

15 Claims, 4 Drawing Sheets

(56) References Cited

U.S. PATENT DOCUMENTS

| | | | |
|---|---|---|---|
| 4,492,140 A | 1/1985 | Pano | |
| 4,604,004 A | 8/1986 | Armbrust | |
| 4,898,054 A | 2/1990 | Byström et al. | |
| 4,936,516 A * | 6/1990 | Hench | 241/294 |
| 4,938,641 A | 7/1990 | Maier | |
| 5,829,423 A | 11/1998 | Benz | |
| 5,833,403 A * | 11/1998 | Barazani | 407/101 |
| 6,325,574 B1 | 12/2001 | Treige | |
| 6,971,823 B2 * | 12/2005 | Satran et al. | 407/46 |
| 7,090,443 B2 | 8/2006 | Hecht et al. | |
| 7,163,361 B2 | 1/2007 | Hecht | |
| 2002/0176754 A1 * | 11/2002 | Barazani | 407/42 |
| 2004/0161311 A1 | 8/2004 | Satran et al. | |
| 2004/0191008 A1 * | 9/2004 | Noggle et al. | 407/46 |
| 2007/0127992 A1 | 6/2007 | Spichtinger et al. | |
| 2009/0290944 A1 | 11/2009 | Gamble et al. | |
| 2010/0254773 A1 | 10/2010 | Hecht | |

FOREIGN PATENT DOCUMENTS

| | | |
|---|---|---|
| DE | 4400538 A1 * | 7/1995 |
| DE | 100 10 223 | 9/2001 |
| EP | 1384543 A1 * | 1/2004 |
| SU | 1227810 | 4/1986 |

\* cited by examiner

US 9,211,596 B2

DETACHABLE CUTTING TOOL SEGMENT WITH RESILIENT CLAMPING AND CUTTING TOOL THEREFOR

FIELD OF THE INVENTION

The present invention relates to cutting tools having cutting inserts retained circumferentially thereon, in general, and to such cutting tools with detachable segments retaining the cutting inserts, in particular.

BACKGROUND OF THE INVENTION

Cutting tools such as slotting cutters and saws have a plurality of cutting inserts retained at their peripheral surface. The cutting inserts may be retained in cutting tool elements, which are separable from the tool holder body. Such cutting tool elements are known to be coupled with the tool holder body in various forms. Some cutting inserts or cutting tool elements are retained in a respective pocket or recess, by a cam maintaining their location.

Cutting tools with cutting tool segments or cutting inserts as described above, are shown, for example, in the following US patent publications: U.S. Pat. Nos. 4,604,004, 4,898,054, 6,325,574, 4,492,140, 3,887,975, 2,860,863, 341,187 and 207,003, as well as in German patent publications DE8513350U1 and DE10010223B4.

It is an object of the subject matter of the present application to provide an improved novel cutting tool segment, which is resiliently retained in the tool holder body, and detachable therefrom, regardless of the retaining of the cutting insert in the cutting tool segment.

SUMMARY OF THE INVENTION

In accordance with the subject matter of the present application, there is provided a cutting tool segment having a longitudinal segment axis extending in a rearward to forward direction, and comprising:

an upper end and a lower end, located on opposite sides of the segment axis, the lower end having two spaced apart lower abutment surfaces, an insert retention portion formed in the upper end, at a forward end of the cutting tool segment; and a resilient retention arm formed in the upper end, rearwardly spaced apart from the insert retention portion, the retention arm having an upper abutment surface;

wherein in a side view of the cutting tool segment, the upper and lower abutment surfaces are linear.

In accordance with the subject matter of the present application, there is provided a cutting tool, comprising: a tool holder body having at least one segment pocket formed at a peripheral surface thereof, and at least one cutting tool segment as described above retained in the at least one segment pocket.

In the cutting tool's tool holder body, each segment pocket has an upper pocket surface and an opposite lower pocket surface, the upper pocket surface having an upper clamping surface and the lower pocket surface having two spaced apart lower clamping surfaces; the upper abutment surface of the cutting tool segment abuts the upper clamping surface of the segment pocket, the lower abutment surfaces of the cutting tool segment abuts the lower clamping surfaces of the segment pocket, and the retention arm is resiliently forced toward the segment axis. At least one cutting insert is retained in the insert retention portion of the at least one cutting tool segment.

BRIEF DESCRIPTION OF THE DRAWINGS

For a better understanding of the present invention and to show how the same may be carried out in practice, reference will now be made to the accompanying drawings, in which.

Figure 1:
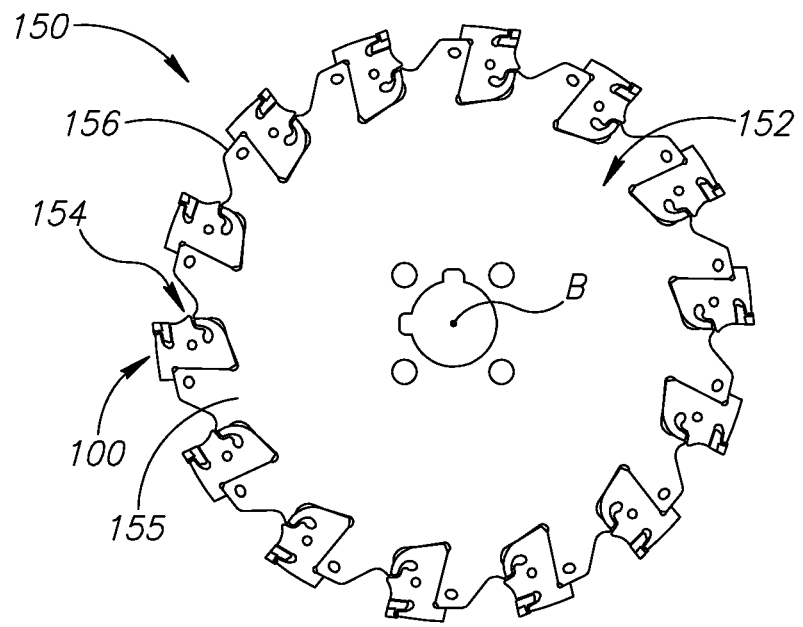
FIG. 1 is a schematic illustration side view of a cutting tool according to an embodiment of the present invention.
Figure 2:
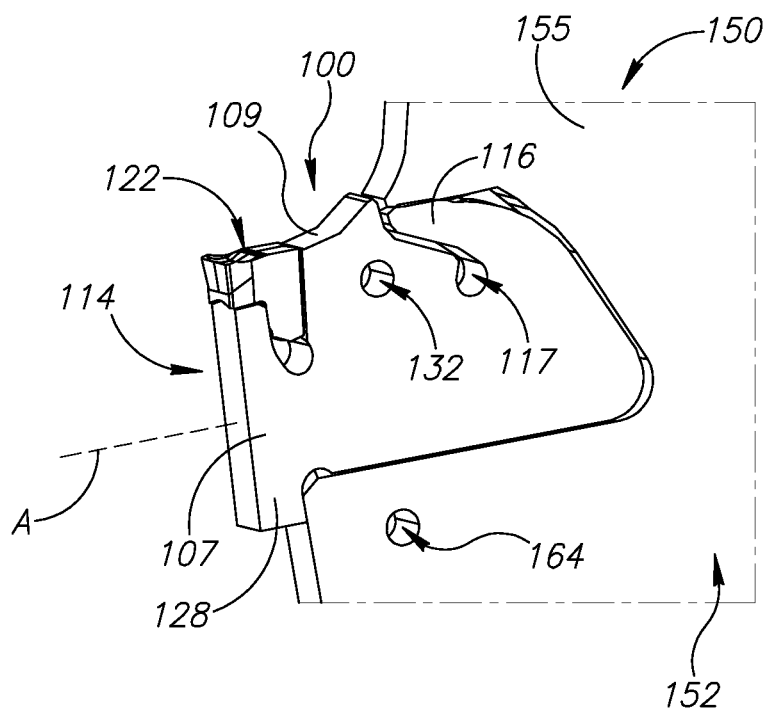
FIG. 2 is a perspective view of a portion of the cutting tool of FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is now made to FIGS. 1-4, depicting various views of a cutting tool 150 according to an embodiment of the present invention. The cutting tool 150 includes a tool holder body 152, having two body side surfaces 155 and a peripheral surface 156 extending therebetween. A plurality of segment pockets 154 are formed in the peripheral surface 156 of the tool holder body 152. The cutting tool 150 also includes a plurality of cutting tool segments 100, each cutting tool segment 100 detachably retained in a respective segment pocket 154. The cutting tool 150 is shown as a rotary cutting tool, having a central rotation axis B. When operating, the cutting tool 150 rotates about the central axis B against a work piece for cutting material off the work piece.

Figure 3:
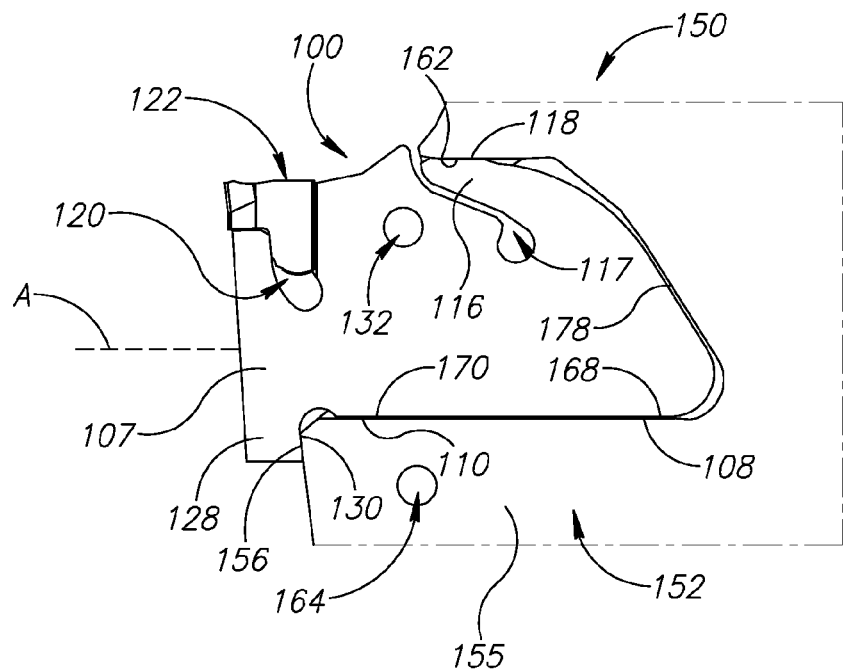
FIG. 3 is a side view of the portion of the cutting tool of FIG. 2.
Figure 4:
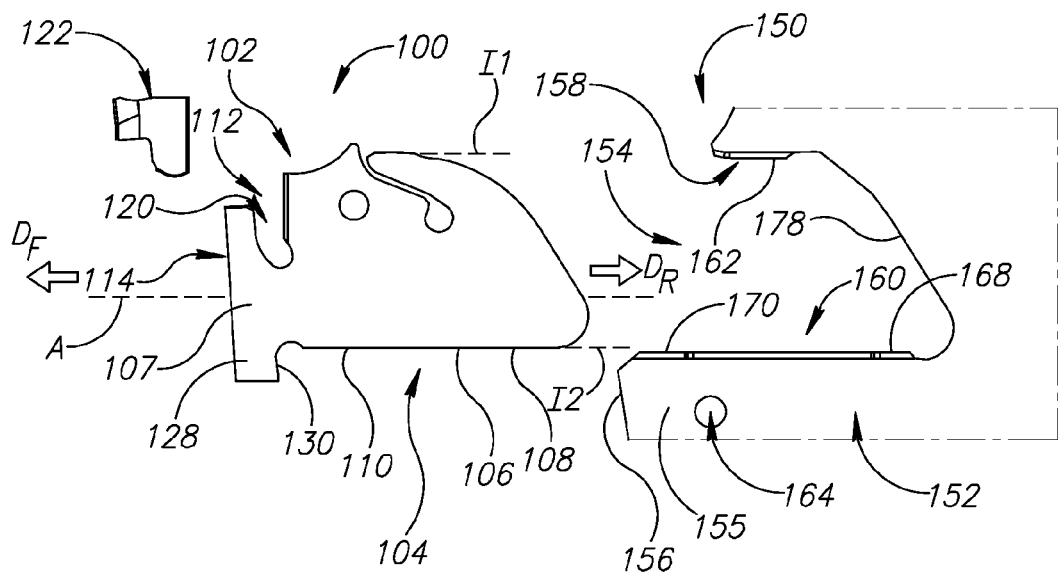
FIG. 4 is an exploded side view of the portion of the cutting tool of FIG. 2.

With particular reference to FIGS. 3-4, each segment pocket 154 has an upper pocket surface 158 and an opposite lower pocket surface 160. A pocket rear surface 178 extends between the upper pocket surface 158 and the lower pocket surface 160. The upper pocket surface 158 has an upper clamping surface 162, and the lower pocket surface 160 has two spaced apart lower clamping surfaces 168, 170.

The cutting tool segment 100 has a longitudinal segment axis A extending in a rearward to forward direction $D_R$, $D_F$. The cutting tool segment 100 includes an upper end 102 and a lower end 104, located on opposite sides of the segment axis A. The lower end 104 has a lower surface 106 with two spaced apart lower abutment surfaces 108, 110. The cutting tool segment 100 has two segment side surface 107 and a segment peripheral surface 109 extending therebetween. A segment rear surface 134 extends in the rear of the cutting tool segment 100 between the lower surface 106 and the back of the resilient retention arm 116.

An insert retention portion 112 is formed in the upper end 102, at a forward end 114 of the cutting tool segment 100. A resilient retention arm 116 is formed in the upper end 102, and has an upper abutment surface 118. The retention arm 116 is rearwardly spaced apart from the insert retention portion 110.

As depicted in FIGS. 3 and 4, in a side view of the cutting tool segment 100, the upper and lower abutment surfaces 118, 108, 110 are linear. In the side view of the cutting tool segment 100, the upper abutment surface 118 lies along an upper line 11, and the lower abutment surfaces 108, 110 lie along a lower line 12. In some embodiments, the upper line 11 and the lower line 12 may be parallel to one another, in some positions of the cutting tool 150 (for example, when the cutting tool segment 100 is mounted in the segment pocket 154). It should be noted, that such upper and lower abutment surfaces 118, 108, 110 (i.e., linear in a side view) are easier to manufacture, for example, compared to abutment surfaces which are curved in a side view. Further, such abutment surfaces are easier for grinding, as compared to curved abutment surfaces. It would be appreciated that the upper and lower abutment surfaces 118, 108, 110 may be V-shaped surfaces, for a firm abutment between the cutting tool segment 100 and the segment pocket 154. It is further noted that the lower abutment surfaces 108, 110 may be two spaced apart sections of a single linear surface, i.e., the lower surface 106.

In the cutting tool 150, each of the at least one cutting tool segment 100 is detachably retained in a respective segment pocket 154, such that the upper abutment surface 118 of the cutting tool segment 100 abuts the upper clamping surface 162 of the segment pocket 154. Further, the lower abutment surfaces 108, 110 of the cutting tool segment 100 are in firm abutment with the lower clamping surfaces 168, 170 of the segment pocket 154, respectively. When the cutting tool segment 100 is advanced rearwards into the segment pocket 154, the retention arm 116 is resiliently forced toward the segment axis A. The movement of the retention arm 116 is possible due to a resilience gap 117 formed adjacent thereto. A firm friction fit is formed between the upper and lower abutment surfaces 118, 108, 110 of the cutting tool segment 100, respectively with the upper and lower clamping surfaces 162, 168, 170 of the segment pocket 154.

In each one of the cutting tool segments 100, a cutting insert 122 is retained in the insert retention portion 112. The insert retention portion 112 may include any arrangement for holding the cutting insert 122. The cutting tool segment 100 shown in the figures of the present application, includes a friction fit resilient retention portion for holding the cutting insert 122 by a friction fit (i.e., without a fastening member as a screw and the like, such as seen in U.S. Pat. No. 7,163,361, whose contents are incorporated by reference). Thus, the insert retention portion 112 is devoid of a threaded bore for receiving a clamping screw or other clamp to retain the cutting insert. However, any other type of insert retention may be employed, for example, such that includes a fastening member, such as seen in U.S. Pat. No. 7,090,443, whose contents are incorporated by reference.

In any case, the resilient retention arm 116 is rearwardly spaced apart from the insert retention portion 112. Thus, the forces applied on the cutting tool segment 100 due to its retention in the segment pocket 154, do not contribute to, or interfere with, the forces applied due to the retention of the cutting insert 122 in the insert retention portion 112. Therefore, it is possible to remove and mount the cutting insert 122 to the cutting tool segment 100 while the cutting tool segment 100 is mounted on the cutting tool body 152.

Figure 5:
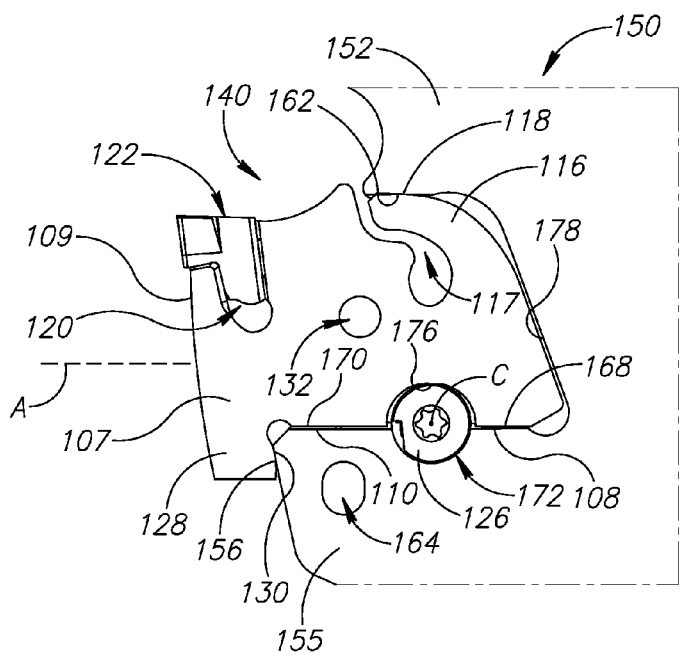
FIG. 5 is a side view of a portion of a cutting tool in accordance with another embodiment of the present invention.
Figure 6:
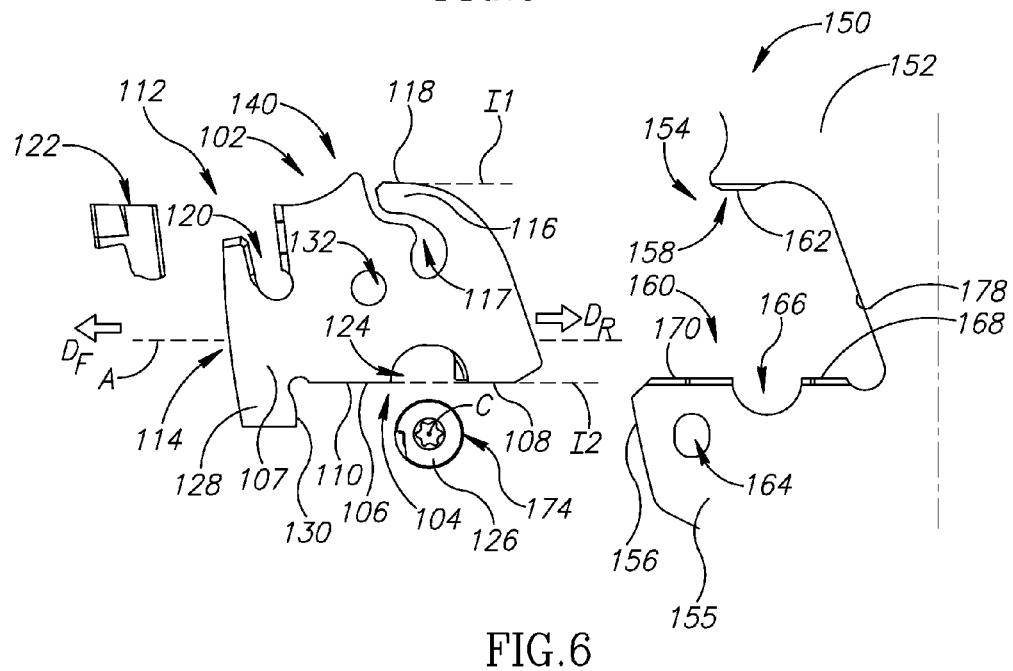
FIG. 6 is an exploded side view of the portion of the cutting tool of FIG. 5.

Reference is further made to FIGS. 5-6, depicting another embodiment of the present invention. In this embodiment, the cutting tool 150 includes the cutting tool body 152 and at least one cutting tool segment 140. The cutting tool segment 140 is similar to the cutting tool segment 100, however the lower surface 106 of the cutting tool segment 140 has a locking recess 124 formed between the lower abutment surfaces 108, 110. The locking recess 124 is indented from the lower surface 106 towards the segment axis A, and is adapted to partially receive a locking member 126.

The lower pocket surface 160 of the segment pocket 154 has a pocket recess 166 formed between the lower clamping surfaces 168, 170. When the cutting tool segment 140 is located within the segment pocket 154, the pocket recess 166 faces the locking recess 124 of the cutting tool segment 100. The pocket recess 166 and the locking recess 124 thus form together a locking aperture 172, adapted to receive the locking member 126 there through. The locking aperture 172 has an inner surface 176. The locking member 126 may be a cam member for firmly locking the respective cutting tool segment 100 in its segment pocket 154, when the cam member is rotated about a cam axis C, which is transverse to the segment axis A.

A portion of the cam member 126 has a portion contour 174 (e.g., a spiral contour or an oval contour), for interacting with a portion of the inner surface 176 of the locking aperture 172, i.e., for simultaneously interacting with the pocket recess 166 and the locking recess 124, when rotated about the cam axis C. When the cam member 126 is rotated about the cam axis C, the portion contour 174 thereof presses against respective portions of the walls of the locking recess 124 and the pocket recess 166. This forms a firmer retention between the cutting tool segment 100 and the segment pocket 154.

The cutting tool segment 100, 140 may further have a segment key aperture 132, opening out to at least one of the segment side surfaces 107, and the holder body 152 has a holder key aperture 164, opening out to at least one of the body side surfaces 155. The segment and holder key apertures 132, 164 are adapted to simultaneously receive respective prongs of an actuating key, which serves to advance the cutting tool segment 100, 140 into and out of the segment pocket 154. The actuating key is configured to advance the cutting tool segment 100, 140 into the segment pocket 154, when rotated in a first direction, and to extract the cutting tool segment 100, 140, when rotated in an opposite direction. If the second embodiment is employed (FIGS. 5-6), the cutting tool segment 140 is advanced into the segment pocket 154, and the locking member 126 is subsequently placed in the locking aperture 172 and then rotated about the cam axis C to fasten the cutting tool segment 100 in the segment pocket 154.

The cutting tool segment 100, 140 may further include a stopper portion 128 located at the forward end 114 thereof. The stopper portion 128 protrudes from the lower surface of the cutting tool segment 100, 140, in a direction away from the segment axis A. The stopper portion 128 has a substantially rearward-facing stopper surface 130 extending transversely to the segment axis A. Upon assembly of the cutting tool 150, the cutting tool segment 100, 140 is advanced into the respective segment pocket 154 until the stopper surface 130 abuts the peripheral surface 156 of the tool holder body 152. The cutting tool segment 100, 140 and the segment pocket 154 are formed such that there is no contact between the cutting tool segment 100, 140 and the pocket rear surface 178 of the segment pocket 154., i.e., the cutting tool segment 100, 140 is stopped before the segment rear surface 134 contacts the pocket rear surface 178.

The cutting tool 150 has a plurality of cutting tool segments 100, 140, and thus a plurality of cutting inserts 122, e.g., in the rotary cutting tool 150 as depicted in FIG. 1. To ensure an efficient cutting action, it is desirable to have the cutting edges of all of the cutting inserts 122 at a similar distance from the central axis B of the cutting tool 150. When all the cutting tool segments 100, 140 have stopper portions 128, they are stopped at the peripheral surface 156 of the tool holder body 152, at a similar distance from the central axis B. In this manner, the stopper portions 128 uniformly locate the cutting edges relative to the central axis B. It would be appreciated that it is easier to determine the location of the cutting edges by stopping the cutting tool segment 100, 140 against the peripheral surface 156, instead of stopping against the pocket rear surface 178, the location of which may vary between the various segment pockets 154.

Figure 7:
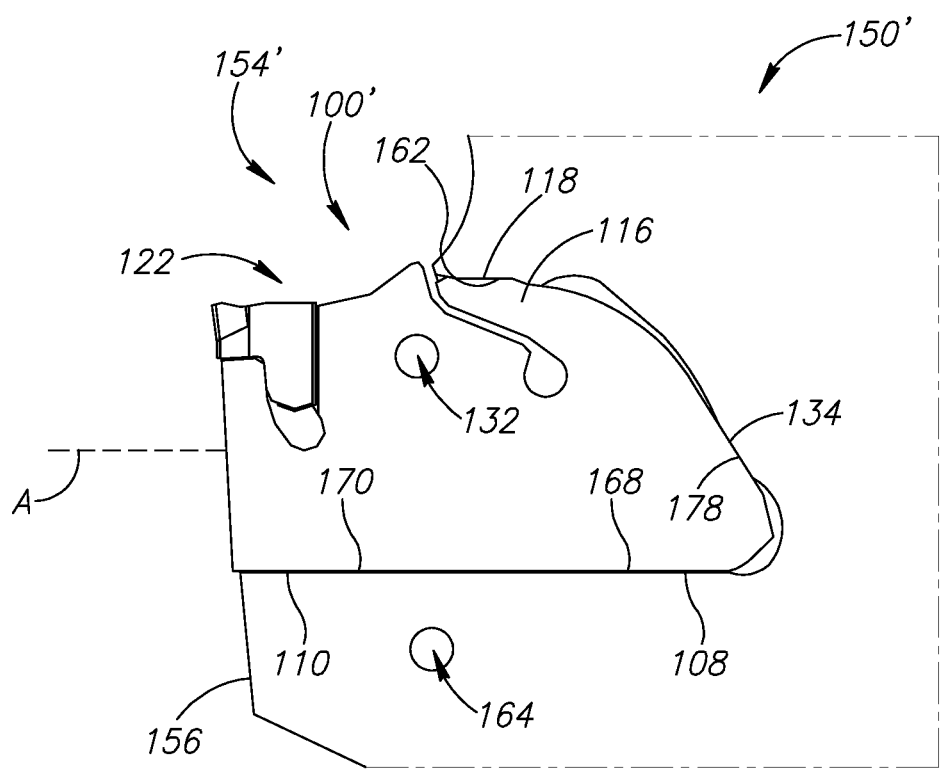
FIG. 7 is a side view of a portion of a cutting tool, according to a further embodiment of the present invention.

Reference is now made to FIG. 7, depicting a portion of a cutting tool 150', according to a further embodiment of the present invention. The cutting tool 150' has a segment pocket 154'. According to this embodiment, a cutting tool segment 100' is similar to cutting tool segment 100, however, the cutting tool segment 100' is formed without the stopper portion 128.

Instead, when the cutting tool segment 100' is mounted in the segment pocket 154', the segment rear surface 134 of the cutting tool segment 100' abuts the pocket rear surface 178 of the segment pocket 154'. In this embodiment, the location of the cutting edge of the cutting insert 122 is determined by stopping the cutting tool segment 100' against the pocket rear surface 178 of the segment pocket 154'.

With further reference to FIG. 1, the cutting tool 150 is shown as a disc-shaped rotary slotting cutter with a plurality of segment pockets 154 and cutting tool segments 100. However, the cutting tool according to the present invention may be any other type of cutter, and may include at least one cutting tool segment with a cutting insert retained therein, for example, a turning cutter with a single segment pocket and a single cutting tool segment retained therein.

The cutting tool body 152 according to the present invention may be constructed of steel. The cutting tool segment 100, 140 may also be constructed of steel. The cutting insert 122 would be constructed of a hard material, suitable for cutting metals, such as cemented carbide and the like.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool segment (100, 140, 100') having a longitudinal segment axis (A) extending in a rearward to forward direction ($D_R$, $D_F$), and comprising:
    an upper end (102) and a lower end (104), located on opposite sides of the segment axis (A), the lower end (104) having two spaced apart lower abutment surfaces (108, 110),
    an insert retention portion (112) formed in the upper end (102), at a forward end (114) of the cutting tool segment (100, 140, 100'); and
    a resilient retention arm (116) formed in the upper end (102), rearwardly spaced apart from the insert retention portion (112) by a resilience gap (117), the retention arm (116) having an upper abutment surface (118);
    wherein in a side view of the cutting tool segment (100, 140, 100'), the upper and lower abutment surfaces (118, 108, 110) are linear.

2. The cutting tool segment (100, 140, 100') according to claim 1, wherein in a side view of the cutting tool segment (100, 140, 100'), the upper abutment surface (118) and the lower abutment surfaces (108, 110) are parallel to one another.

3. The cutting tool segment (100, 140, 100') according to claim 1, wherein the insert retention portion (112) includes an insert pocket (120) adapted to receive a cutting insert (122) and hold the cutting insert (122) by a friction fit.

4. The cutting tool segment (100) according to claim 1, wherein the lower surface (106) further has a locking recess (124) located between the lower abutment surfaces (108, 110), the locking recess (124) adapted to partially receive a locking member (126).

5. The cutting tool segment (100, 140) according to claim 1, further comprising a stopper portion (128) located at the forward end (114) of the cutting tool segment (100, 140), the stopper portion (128) having a rearward facing stopper surface (130) extending transversely to the segment axis (A), the stopper portion (128) extending in a direction away from the segment axis (A) at the cutting tool segment's lower end (104).

6. A cutting tool (150, 150'), comprising:
    a tool holder body (152) having at least one segment pocket (154, 154') formed at a peripheral surface (156) thereof, and
    at least one cutting tool segment (100, 140, 100') according to claim 1, retained in the at least one segment pocket (154, 154').

7. The cutting tool (150, 150') according to claim 6, wherein:
    in the tool holder body (152), each segment pocket (154, 154') has an upper pocket surface (158) and an opposite lower pocket surface (160), the upper pocket surface (158) having an upper clamping surface (162) and the lower pocket surface (160) having two spaced apart lower clamping surfaces (168, 170);
    the upper abutment surface (118) of the cutting tool segment (100, 140, 100') abuts the upper clamping surface (162) of the segment pocket (154), the lower abutment surfaces (108, 110) of the cutting tool segment (100, 140, 100') abuts the lower clamping surfaces (168, 170) of the segment pocket (154, 154'), and the retention arm (116) is resiliently forced toward the segment axis (A); and
    at least one cutting insert (122) is retained in the insert retention portion (112) of the at least one cutting tool segment (100, 140, 100').

8. The cutting tool (150) according to claim 7, wherein:
    the at least one cutting tool segment (100, 140) further comprises a stopper portion (128) located at the forward end (114) of the at least one cutting tool segment (100, 140), the stopper portion (128) having a rearward facing stopper surface (130) extending transversely to the segment axis (A); and
    the stopper surface (130) abuts the peripheral surface (156) of the tool holder body (152).

9. The cutting tool (150) according to claim 7, wherein:
    the lower surface (106) of the at least one cutting tool segment (100) further has a locking recess (124) located between the lower abutment surfaces (108, 110),
    the lower pocket surface (160) of the at least one segment pocket (154) has a pocket recess (166) formed between the lower clamping surfaces (168, 170), the pocket recess (166) facing the locking recess (124) and forming therewith a locking aperture (172) adapted to receive a locking member (126) therethrough.

10. The cutting tool (150) according to claim 9, wherein the locking member (126) is a cam member for firmly locking the respective cutting tool segment (100) in its segment pocket (154), when the cam member is rotated about a cam axis (C) transverse to the segment axis (A).

11. The cutting tool (150) according to claim 10, wherein the cam member (126) has a portion contour (174) for interacting with an inner surface (176) of the locking aperture (172), when the cam member is rotated about the cam axis (C).

12. The cutting tool (150, 150') according to claim 7, wherein the cutting tool segment (100, 140, 100') has a segment key aperture (132) formed therein, and the holder body (152) has a holder key aperture (164) formed therein, the segment and holder key apertures (132, 164) being adapted to simultaneously receive respective prongs of an actuating key.

13. The cutting tool (150, 150') according to claim 7, wherein the cutting insert is retained in the insert retention portion (112) by a friction fit.

14. The cutting tool (150, 150') according to claim 7, wherein the cutting insert only contacts the cutting tool segment's insert retention portion (112).

15. A cutting tool segment (100, 140, 100') having a longitudinal segment axis (A) extending in a rearward to forward direction ($D_R$, $D_F$), and comprising:
- an upper end (102) and a lower end (104), located on opposite sides of the segment axis (A), the lower end (104) having two spaced apart lower abutment surfaces (108, 110),
- an insert retention portion (112) formed in the upper end (102), at a forward end (114) of the cutting tool segment (100, 140, 100'); and
- a resilient retention arm (116) formed in the upper end (102), the retention arm having an upper abutment surface (118), an entirety of the resilient retention arm (116) being located rearwardly of the insert retention portion (112) and spaced apart therefrom by a resilience gap (117);
- wherein in a side view of the cutting tool segment (100, 140, 100'), the upper and lower abutment surfaces (118, 108, 110) are linear.

* * * * *